June 13, 1961 W. SENSENIG 2,988,703

CONTROL CIRCUIT

Filed Dec. 3, 1956

INVENTOR.
WARREN SENSENIG
BY Darby + Darby
ATTORNEY(S)

2,988,703
CONTROL CIRCUIT
Warren Sensenig, Cedar Grove, N.J., assignor, by mesne assignments, to Fairchild Camera and Instrument Corporation, Syosset, N.Y., a corporation of Delaware
Filed Dec. 3, 1956, Ser. No. 626,015
9 Claims. (Cl. 328—229)

This invention relates to control circuits.

Remote amplitude control of varying signals, without either attenuating the signals or introducing any frequency limitations, is frequently desirable. To accomplish this result in the past, it has been necessary to amplify the signal in a first stage, and to introduce remote control in a second stage. The second stage was necessary in order to handle direct voltages, rather than the varying signals it was desired to amplify.

It is also frequently desirable to temporarily disable a circuit by "locking-out" signals which might otherwise energize the circuit. These signals could either be undesirable disturbances similar to noise and static, or else gating pulses or synchronizing signals which for some reason are undesired at that particular instant. A concept similar to lock-out permits other circuits known as "coincidence" and "anticoincidence" circuits to achieve their desired result. In the past, disabling circuits as above described required complex circuitry and/or clamp tubes, all of which introduced signal distortion, frequency limitations, additional components, and greater expense.

It is therefore the principal object of my invention to provide an improved control circuit.

It is another object of my invention to provide a simple, inexpensive circuit which inherently amplifies and provides lock-out.

It is a further object of my invention to provide an improved amplifier and control circuit in one stage.

The attainment of these objects and others will be realized from the following specification, taken in conjunction with the drawings, of which, FIG. 1 depicts the basic concept of my invention;

The basic concept of my invention uses a beam-deflection electron tube, such as a 6AR8, as a combination amplifier and remote amplitude control stage. The circuitry herein disclosed may be utilized for varying such signals as the volume of a radio, contrast of a television picture, etc. Various embodiments of this basic concept illustrate the use of this type of tube for lock-out, coincidence, and anticoincidence circuitry.

Figure 1:
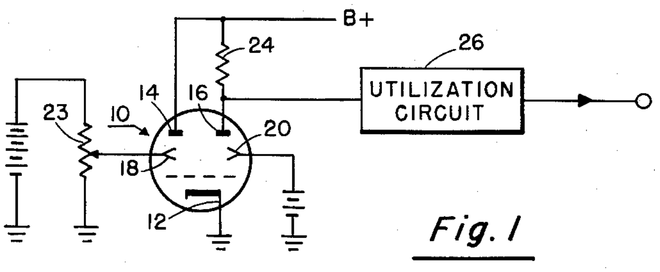

Referring now to FIG. 1 there is diagrammatically illustrated this type of tube wherein the path of the electrons is controlled so that they strike one of a plurality of anodes. Tube 10 achieves this result by having a cathode 12 emit electrons which are formed into a sheet or a beam by means which are known in the art, and therefore are not shown. This particular tube has two anodes 14 and 16, and two deflection electrodes 18 and 20. One control grid is shown, but others are also incorporated in the tube structure. In the operation of this tube, potentials applied to deflection electrodes 18 and 20 cause the electrons to follow a curved path, and thus strike either anode 14 or 16.

Another type of tube, the 6BN6, achieves a similar result by causing the electrons to follow a straight path to strike a first collector anode, or to be reflected to strike a second collector electrode known as an accelerator. My invention may use either of the tubes described (the 6AR8 and the 6BN6), or others of this general class, but the 6AR8 has an advantage in that its control grid affords a high amplification comparable to that of pentodes.

Referring again to my circuit as shown in FIG. 1, bias potentials are applied to deflection electrodes 18 and 20 so that during quiescence the beam strikes anode 16, thus producing an output signal across resistance 24. This signal is then applied to utilization circuit 26. When it is desired to decrease the volume or the contrast, a control potentiometer 23 increases the potential applied to deflection electrode 18, thus attracting the electron beam toward anode 14. The amount of attraction depends upon the value of the control potential, and reduces the current flowing through resistance 24. In this way, there is a precise control over the amplitude of the output signal, and the control circuit connected to deflection electrode 18 utilizes only a direct potential. Since this circuit merely applies a potential and does not carry current, there are minimal losses and power requirements; and since this circuit does not carry the signal itself, the attenuation and frequency-limiting disadvantages of prior art circuitry are obviated.

In addition, since there is no change of grid bias, the tube continues to operate along the linear portion of its operation characteristic, thus avoiding the non-linearity inherently associated with prior art amplitude attenuation.

Figure 2:
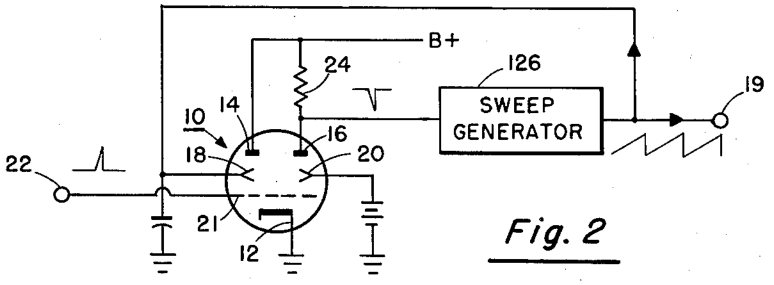
FIG. 2 shows an embodiment for achieving lock-out.

FIG. 2 discloses an embodiment of my invention which permits level selection. It will be seen that the utilization circuit consists of a sweep generator 126. Circuitry for this purpose is well known; a particularly effective circuit for producing a sawtooth wave form is completely described in copending application Serial No. 446,011, entitled Sweep Generator by Robert F. Casey, and filed July 27, 1954.

In FIG. 2, bias potentials applied to the deflection electrodes position the beam so that in its quiescent state it strikes anode 16. Positive going synchronizing pulses for triggered operation are applied to input terminal 22 and thus to control grid 21. A synchronizing pulse will cause an increase in the beam striking anode 16, and this increased current flowing through resistance 24 will produce a negative going triggering impulse which will energize sweep generator 126. A portion of the output of the sweep generator is applied back to deflection electrode 18, and attracts the electron beam, causing it to impinge on anode 14. Since sweep generator 126 has been triggered into operation, it produces its characteristic waveform at output terminal 19. Any synchronizing pulses or disturbances applied to control grid 21 serve to vary the electron beam which is impinging on anode 14, and will have no effect on the output circuits; being thus effectively locked out. At the end of the sawtooth waveform, circuitry inherent in the sweep generator will produce a portion known as "retrace," and the signal which had been applied to deflection electrode 18 will be removed. The path of the beam will revert to its original position, impinging on anode 16, and only then will sweep generator 126 be affected by incoming signals applied to input terminal 22 and control grid 21.

It may readily be seen that various other polarity possibilities may be utilized to achieve substantially the same result. For example, a negative going signal may be obtained by polarity inversion from sweep generator 126, and applied to deflection electrode 20.

Figure 3:
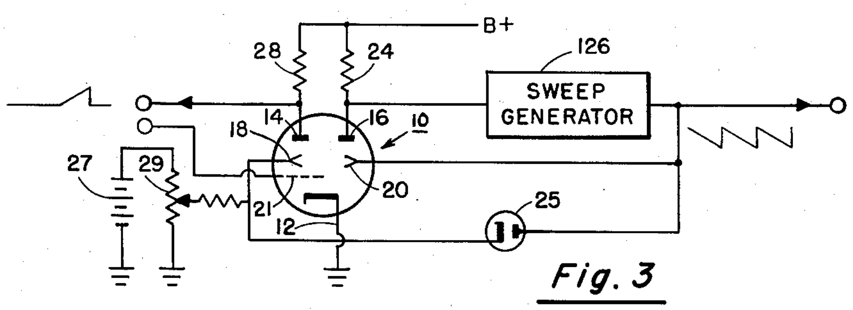
FIG. 3 illustrates another embodiment useful for delay and level sensing.

FIG. 3 illustrates another embodiment of my invention which permits a delay to occur after a synchronizing pulse, before there is any output. In this embodiment, a coupling device such as diode 25, connects the two deflection electrodes 18 and 20. This circuit operates in a manner similar to that described above except that the lock out feature is modified to include a delay circuit. Instead, the signal from sweep generator 126 (shown for convenience as negative going) applied to deflection electrode 20 is also applied through diode 25 to deflection electrode 18. Since the same potential is applied to both deflection electrodes, the position of the beam is unaffected. However, when the signal derived from sweep generator 126 becomes more negative than the bias established by source 27 and delay potentiometer 29, diode 25 becomes non-conductive and no further signal is applied to deflection electrode 18. However, the increasingly negative going signal applied to deflection electrode 20 causes the beam path to curve and impinge on anode 14. Current flowing through resistance 28 will therefore produce an output signal whose appearance has been delayed by an interval predetermined by the setting of delay potentiometer 29. In this way, there is no output at anode 14 until the predetermined level has been reached, whereupon the output then appears. At the same time lockout action with respect to output at anode 16 is reinstated and may be utilized after the delay or above the predetermined level, in the manner previously described.

The above embodiment, that of delay or activation at a predetermined level, may be particularly useful in frequency dividers, one form of which is described in copending application, now Patent No. 2,820,899, issued January 21, 1958, entitled Frequency Divider Circuit by Emil E. Sanford. As is explained in this application, it is frequently difficult to select a predetermined level on a waveform, and the circuit described in the instant application overcomes the disadvantages associated with prior art frequency divider circuits.

Figure 4:
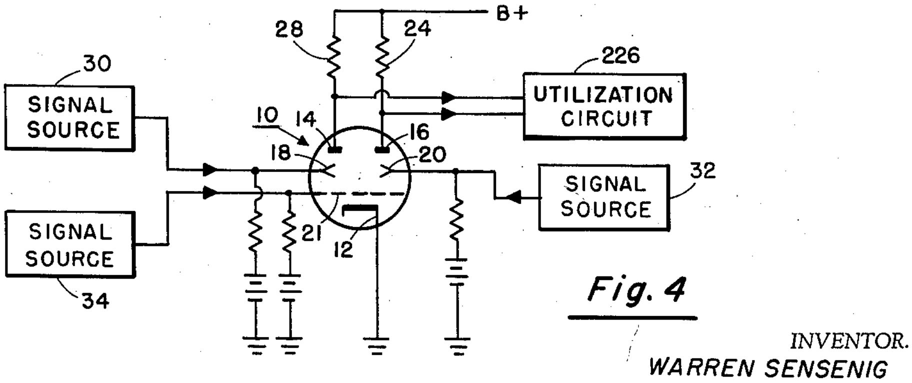
FIG. 4 shows still a further embodiment that may be used for coincidence and anti-coincidence circuits.

Referring now to FIG. 4, it will be seen that independent circuits 30 and 32 apply separate signals to deflection electrodes 18 and 20. During quiescence, the electron beam is positioned so that it either passes between anodes 14 and 16, or affects each anode equally. If the two signals applied to deflection electrodes 18 and 20 are simultaneous and of equal amplitude (coincident) the position of the beam is unaffected and there is no change in the output. If the signals are applied at different times the beam position will be altered, depending upon the timing of the input signals, to produce an output signal. This type of circuit is known as an "anti-coincidence" circuit, because only at that time is there an output signal.

A coincidence circuit may be obtained by positioning the beam on anode 14, and then biasing control grid 21 to cutoff. If suitable polarity signals are now simultaneously applied to control grid 21 by signal source 34 and to one of the deflection electrodes 18 and/or 20 by their respective sources 30 and/or 32, the electron beam will be simultaneously turned on and deflected to impinge on anode 14. Output signals of opposite polarity will be obtained from the output resistances. However, either a single signal or non-coincidence of signals, would produce no output.

It may also be seen that suitable potentials may be applied to deflection electrodes 18 and 20 to position the beam between them, and control grid 21 then biased to cutoff. If signals are simultaneously applied to the control grid and either deflection electrode, an output signal will be obtained from one of the output circuits, depending upon the polarity on the deflecting signal. In this way, two separate coincidence circuits may be obtained.

As shown above, my disclosed circuitry permits the achievement of an anti-coincidence, or two separate types of coincidence.

The circuit of FIG. 4 may also be used as a differential amplifier. Signals of unequal amplitude or phase applied to deflection electrodes 18 and 20 will produce a push-pull output signal in accordance with said differences.

It is obvious that those versed in the art may produce modifications within the scope of my invention. I desire, therefore, to be limited not by the foregoing embodiments and illustrations, but rather by the claims granted to me.

What is claimed is:

1. A circuit comprising: an electron tube of the beam deflecting type, said tube having a pair of output electrodes, a pair of deflection electrodes, a control grid and means to produce an electron beam; an output resistance connected to one of said output electrodes; bias means connected to one of said deflection electrodes to position said electron beam on said output electrode; a circuit connected to said output electrode producing a variable level signal, said circuit having an output terminal; means applying a triggering signal to said grid to activate said circuit; means applying said output of said circuit to a first one of said deflection electrodes; a diode connected between said deflection electrodes; means causing said diode to become non-conductive at a given level of said output of said circuit, whereby said beam is deflected to strike the other said output electrode.

2. A delay circuit comprising: an electron tube of the beam deflecting type, said tube having a pair of output electrodes, a pair of deflection electrodes, a control grid and means to produce an electron beam; a first output resistance connected to a first one of said output electrodes; a second output resistance connected to the second said output electrode; bias means connected to one of said deflection electrodes to position said electron beam on said first output electrode; a sweep generator connected to said first output electrode, said generator having an output terminal; means applying a triggering signal to said grid to energize said sweep generator; means applying said output of said generator to one of said deflection electrodes; a diode connected between said deflection electrodes; means causing said diode to become non-conductive at a given level of said output of said generator, said means comprising a bias potential applied to said diode, whereby above said given level said diode is non-conductive, and output signal of said generator is applied to only the second said deflection electrode to position said beam on said second output electrode and produce a delayed output signal from said second output resistance.

3. The circuit comprising: an electron beam deflecting tube having electron beam producing means, first and second anodes, first and second beam deflection plates and an input signal control grid; and means to quiescently position said electron beam on said first anode; a generator producing a waveform which has a sweep portion and a retrace portion; means energizing said generator, said means comprising a connection between the input of said generator and said first anode and means applying a triggering signal to said grid; and means to prevent said input signal at said grid from appearing at said first anode during said sweep portion of said waveform.

4. A circuit comprising: an electron beam deflecting tube having electron beam producing means, first and second anodes, a control grid, and first and second beam deflecting plates; means to initially position said electron beam on said first anode; means applying a signal to said control grid whereby a triggering signal is produced at said first anode; a sawtooth waveform generator producing a waveform having a sloped portion and a retrace portion; means triggering said generator, said means comprising a connection between the input of said generator and said first anode whereby said triggering signal is applied to said generator; means preventing said signal at said grid from appearing at said first anode during said sloped portion, including a connection between the output of said generator and one of said deflection plates whereby said sawtooth waveform is caused to move said electron beam from said first anode during said sloped portion and to return to said first anode during said retrace portion.

5. A lockout circuit comprising: an electron beam deflecting tube having electron beam producing means, first and second anodes, a control grid, and means for controlling the position of said electron beam, said position controlling means comprising first and second deflecting plates; direct bias means applying a potential to one of said deflection plates to initially position said electron beam on said first anode; means applying a synchronizing pulse to said control grid whereby a triggering signal is produced at said first anode; a generator for producing a sawtooth waveform which has a sloped portion and a retrace portion; means triggering said generator, said means comprising a connection between the input of said generator and said first anode; means preventing said signal at said grid from appearing at said first anode during said sloped portion, wherein said sawtooth waveform is caused to move said electron beam from said first anode for the duration of said sloped portion and to return during said retrace portion, said last means comprising a connection between the output of said generator and said other deflection plate whereby synchronizing signals applied to said control grid during said sloped portion do not affect said generator, and are locked out.

6. A lockout circuit comprising: an electron beam deflecting tube having electron beam producing means, first and second anodes, a control grid, and means for controlling the position of said electron beam, said position controlling means comprising first and second deflecting plates; direct bias means applying a potential to one of said deflection plates to initially position said electron beam on said first anode; means applying a positive going synchronizing pulse to said control grid whereby a negative going output signal is produced at said first anode; a generator capable of producing a sawtooth waveform having a positive going portion and a negative going portion, said generator being capable of being triggered only by a negative going signal; means energizing said generator, said means comprising a connection between the input of said generator and said first anode whereby said generator is energized by said negative going output signal produced at said first anode; means causing said positive going portion of said sawtooth waveform to move said electron beam from said first anode and causing said negative going portion of said sawtooth waveform to re-position said electron beam onto said first anode, said means comprising a connection between the output of said generator and said second deflection plate whereby said positive going portion of said sawtooth waveform increases the potential at said second deflection plate and attracts said electron beam toward said second deflection plate for the duration of one positive going sawtooth waveform, said generator being immune to synchronizing pulses which occur during said duration, and said negative going portion of said sawtooth waveform returns said beam to its initial position on said first anode whereby said generator may again be triggered by synchronizing pulses applied to said control grid.

7. A delayed output circuit comprising: an electron beam deflecting tube having electron beam producing means, first and second anodes, a control grid, and means controlling the position of said electron beam, said position controlling means comprising first and second deflecting plates; means to initially position said electron beam on said first anode; a generator for producing a sawtooth waveform; means energizing said generator, said means comprising a connection between the input of said generator and said first anode and means applying a triggering signal to said control grid; means applying said sawtooth waveform to one of said deflection plates, said means comprising a direct connection between the output of said generator and said deflection plate; means applying said sawtooth waveform to said second deflection plate, said means comprising a decoupling tube whereby when said decoupling tube is conductive, the same waveform is applied to both said deflection plates, and said beam remains in its initial position; means causing said decoupling tube to become non-conductive at a predetermined level whereby said sawtooth waveform is applied to only one deflection plate, and therefore positions said beam to impinge on said second anode, to produce a delayed output signal thereat.

8. A delayed output circuit comprising: an electron beam deflecting tube having electron beam producing means, first and second anodes, a control grid, and means for controlling the position of said electron beam, said position controlling means comprising first and second deflecting plates; means applying a direct bias potential to one of said deflection plates to initially position said electron beam on said first anode; means applying a positive going synchronizing pulse to said control grid whereby a negative going output signal is produced at said first anode; a generator capable of producing a sawtooth waveform having a positive going portion and a negative going portion, said generator capable of being triggered only by a negative going signal; means energizing said generator, said means comprising a direct connection between the input of said generator and said first anode whereby said generator is energized by said negative going output signal produced at said first anode; means applying said sawtooth waveform to said first deflection plate, said means comprising a direct connection between the output of said generator and said deflection plate; means applying said sawtooth waveform to said second deflection plate, said means comprising a decoupling tube whereby when said decoupling tube is conductive, the same waveform is applied to both said deflection plates, and said beam remains in its initial position; means causing said decoupling tube to become nonconductive at a predetermined potential level whereby said sawtooth waveform is applied to only said first deflection plate, and therefore positions said beam to impinge on said second anode, to produce a delayed output signal thereat.

9. The device of claim 4 including delay means causing said means preventing said signal at said grid from appearing at said first anode to be inoperative below a predetermined level of said sawtooth.

References Cited in the file of this patent

UNITED STATES PATENTS

| | | |
|---|---|---|
| 2,107,410 | Dreyer | Feb. 8, 1938 |
| 2,229,700 | Hollman | Jan. 28, 1941 |
| 2,262,407 | Rath | Nov. 11, 1941 |
| 2,266,509 | Percival et al. | Dec. 16, 1941 |
| 2,523,162 | Sunstein | Sept. 19, 1950 |
| 2,597,571 | Cuccia | May 20, 1952 |
| 2,644,085 | Glass | June 30, 1953 |
| 2,657,330 | Hepp | Oct. 27, 1953 |
| 2,710,361 | Skellett | June 7, 1955 |
| 2,758,210 | Adler | Aug. 7, 1956 |
| 2,874,283 | Neff | Feb. 17, 1959 |

OTHER REFERENCES

"Beam-Deflection Tube Simplifies Color Decoders," by Adler et al., in Electronics, May 1954, pages 148–151.